(12) United States Patent
Gentle et al.

(10) Patent No.: US 10,620,004 B2
(45) Date of Patent: Apr. 14, 2020

(54) SURVEYING SYSTEM AND METHOD USING MOBILE WORK MACHINE

(71) Applicant: Caterpillar Inc., Peoria, IL (US)

(72) Inventors: Michael Charles Gentle, Maroa, IL (US); Daniel Patrick Gillen, Macon, IL (US); Ethan Michael Tevis, Bloomington, IL (US)

(73) Assignee: Caterpillar Inc., Peoria, IL (US)

( * ) Notice: Subject to any disclaimer, the term of this patent is extended or adjusted under 35 U.S.C. 154(b) by 617 days.

(21) Appl. No.: 15/411,021

(22) Filed: Jan. 20, 2017

(65) Prior Publication Data

US 2018/0209120 A1 Jul. 26, 2018

(51) Int. Cl.

| | | |
|---|---|---|
| *G01C 9/02* | (2006.01) | |
| *E02F 3/76* | (2006.01) | |
| *B60W 40/112* | (2012.01) | |
| *G05D 1/02* | (2020.01) | |
| *E02F 9/26* | (2006.01) | |
| *E02F 9/20* | (2006.01) | |
| *G01C 7/04* | (2006.01) | |
| *B60W 50/00* | (2006.01) | |

(52) U.S. Cl.
CPC ............. *G01C 9/02* (2013.01); *B60W 40/112* (2013.01); *E02F 3/7636* (2013.01); *E02F 9/2054* (2013.01); *E02F 9/261* (2013.01); *G01C 7/04* (2013.01); *G05D 1/027* (2013.01); *B60W 2050/0026* (2013.01); *B60W 2300/17* (2013.01); *B60W 2520/16* (2013.01); *B60W 2520/18* (2013.01); *B60W 2550/40* (2013.01); *G05D 2201/0202* (2013.01)

(58) Field of Classification Search
None
See application file for complete search history.

(56) References Cited

U.S. PATENT DOCUMENTS

| | | |
|---|---|---|
| 4,422,322 A | 12/1983 | Spangler |
| 4,741,207 A | 5/1988 | Spangler |
| 4,796,998 A | 1/1989 | Soma et al. |
| 5,440,923 A | 8/1995 | Arnberg et al. |
| 8,170,726 B2 | 5/2012 | Chen et al. |

(Continued)

FOREIGN PATENT DOCUMENTS

EP    0 405 725    2/1991

*Primary Examiner* — Roy Y Yi (74) *Attorney, Agent, or Firm* — Finnegan, Henderson, Farabow, Garrett & Dunner, LLP.

(57) ABSTRACT

A surveying system is provided having a work machine with at least one sensor configured to produce a signal indicative of a longitudinal pitch of the work machine and a lateral roll of the work machine. The work machine additionally includes a locating device configured to determine the location of the work machine, a communicating device configured to communicate over a network, and a controller in communication with the at least one sensor and the locating device. The controller is configured to receive the signals from the at least one sensor, create survey data by linking the signals with the location of the work machine, and communicate the survey data using the communicating device over the network to one or more offboard controllers. At least one offboard controller is configured to compare the survey data to one or more threshold values, calculate variances, and generate a map displaying the variances.

18 Claims, 5 Drawing Sheets

(56) References Cited

U.S. PATENT DOCUMENTS

| | | | |
|---|---|---|---|
| 8,265,826 B2 * | 9/2012 | Feller | A01B 69/007 |
| | | | 701/41 |
| 8,306,747 B1 | 11/2012 | Gagarin et al. | |
| 9,085,877 B2 | 7/2015 | Wahlmark et al. | |
| 2004/0130702 A1 * | 7/2004 | Jupp | G01S 7/497 |
| | | | 356/5.01 |
| 2006/0276939 A1 | 12/2006 | Ameen | |
| 2015/0361642 A1 * | 12/2015 | Stratton | G06F 16/23 |
| | | | 701/461 |

* cited by examiner

SURVEYING SYSTEM AND METHOD USING MOBILE WORK MACHINE

TECHNICAL FIELD

The present disclosure relates generally to a surveying system and method using a mobile work machine, and more particularly, to a surveying system and method that can be used to survey roadways and other surfaces using a work machine having one or more sensors.

BACKGROUND

Maintaining the proper cross slope and longitudinal slope of a roadway is important for water drainage and safe operation of vehicles on the roadway, particularly in mining and construction environments. Cross slope is the transverse slope of the road surface, extending laterally and measured relative to the horizon. Cross slope measures the crown of a roadway, which generally includes a high point at the center and downwardly-sloping sides when viewed as a lateral cross section. Proper cross slope provides a gradient for water runoff into a drainage system such as a street gutter or ditch. Longitudinal slope, by comparison, is the slope of the roadway with respect to the direction of travel relative to the horizon. Longitudinal slope measures the grade of the roadway over a distance traveled, which affects the load on work machines carrying heavy cargo. Traditional methods of measuring cross slope and longitudinal slope include dispatching survey crews to manually measure points along the roadway. This technique is useful but requires a human crew to mark individual points along the roadway one point at a time, which is time consuming and slow.

One method of gathering roadway data using vehicle sensors is described in U.S. Patent Application Publication No. 2006/0276939 (the '939 publication), published to Ameen on Dec. 7, 2006. The '939 publication describes a method, apparatus, and system for estimating a grade angle and superelevation angle of a roadway using a vehicle equipped with accelerometers and a yaw rate sensor. Data from these sensors is used to calculate the estimated grade angle and superelevation angle (e.g., bank angle) of the roadway being traversed by the vehicle.

Although the '939 publication provides a means to estimate the grade angle and superelevation angle, it does not disclose using sensors from a work machine. Nor does the '939 publication disclose generating a real-time map of cross-slope and longitudinal slope variances.

The disclosed system is directed to overcoming one or more of the problems set forth above.

SUMMARY OF THE INVENTION

In one aspect, the present disclosure is directed to a surveying system that includes a work machine having at least one sensor configured to produce a signal indicative of a longitudinal pitch of the work machine and a signal indicative of a lateral roll of the work machine. The system also includes a locating device disposed on the work machine configured to determine the location of the work machine, a communicating device disposed on the work machine configured to communicate over a network, and a controller disposed on the work machine and in communication with the at least one sensor and the locating device. The controller is configured to receive the signals from the at least one sensor, create survey data by linking the signals with the location of the work machine, and communicate the survey data using the communicating device over the network to one or more offboard controllers. The at least one offboard controller is configured to compare the survey data to one or more threshold values and calculate variances, and generate a map displaying the variances.

In another aspect, the present disclosure is directed to a method of surveying that includes receiving signals from at least one sensor on a work machine, the at least one sensor configured to produce a signal indicative of a longitudinal pitch of the work machine and a signal indicative of a lateral roll of the work machine. The method further includes receiving a location of the work machine, creating survey data by linking the signals with the location of the work machine, and communicating the survey data over a network.

In yet another aspect, the present disclosure is directed to a method of surveying that includes receiving sensor data from at least one sensor on a work machine, the at least one sensor configured to produce a signal indicative of a longitudinal pitch of the work machine and a signal indicative of a lateral roll of the work machine. The method further includes receiving a location of the work machine linked to each of the sensor data, comparing the sensor data to one or more threshold values and calculating variances, and generating a map of the variances based on the location of the work machine for each sensor data.

DETAILED DESCRIPTION

Figure 1:
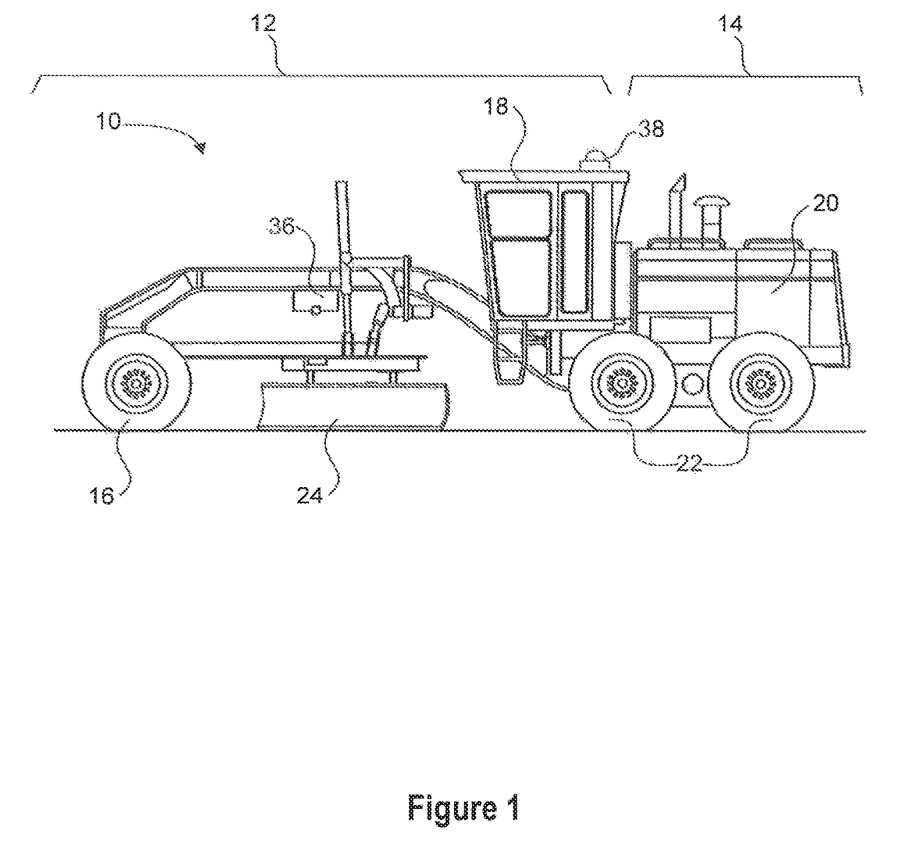
FIG. 1 is a side view of an exemplary disclosed work machine.

FIG. 1 illustrates an exemplary disclosed work machine 10. In the depicted example, the work machine 10 is a motor grader. As a motor grader, the work machine 10 may include a steerable front frame 12, and a driven rear frame 14 that is pivotally connected to the front frame 12. The front frame 12 may include a pair of front wheels 16 (or other traction devices), and support a cabin 18. The rear frame 14 may include compartments 20 for housing a power source (e.g., an engine) and associated cooling components, the power source being operatively coupled to rear wheels 22 (or other traction devices) for primary propulsion of the work machine 10. The rear wheels 22 may be arranged in tandems at opposing sides of the rear frame 14. Steering of the work machine 10 may be a function of both front wheel steering and articulation of the front frame 12 relative to the rear frame 14.

The motor grader may also include a ground-engaging work tool such as, for example, a moldboard blade 24 (e.g., a motor grader blade). The moldboard blade 24 may be operatively connected to and supported by the front frame 12. In the disclosed embodiment, the moldboard blade 24 is suspended from a general midpoint of the front frame 12, at a location between front and rear wheels 16, 22. It is contemplated that the moldboard blade 24, however, may be alternatively be connected to and supported by another portion of the work machine 10, such as by another portion of front frame 12 and/or rear frame 14.

Figure 2:
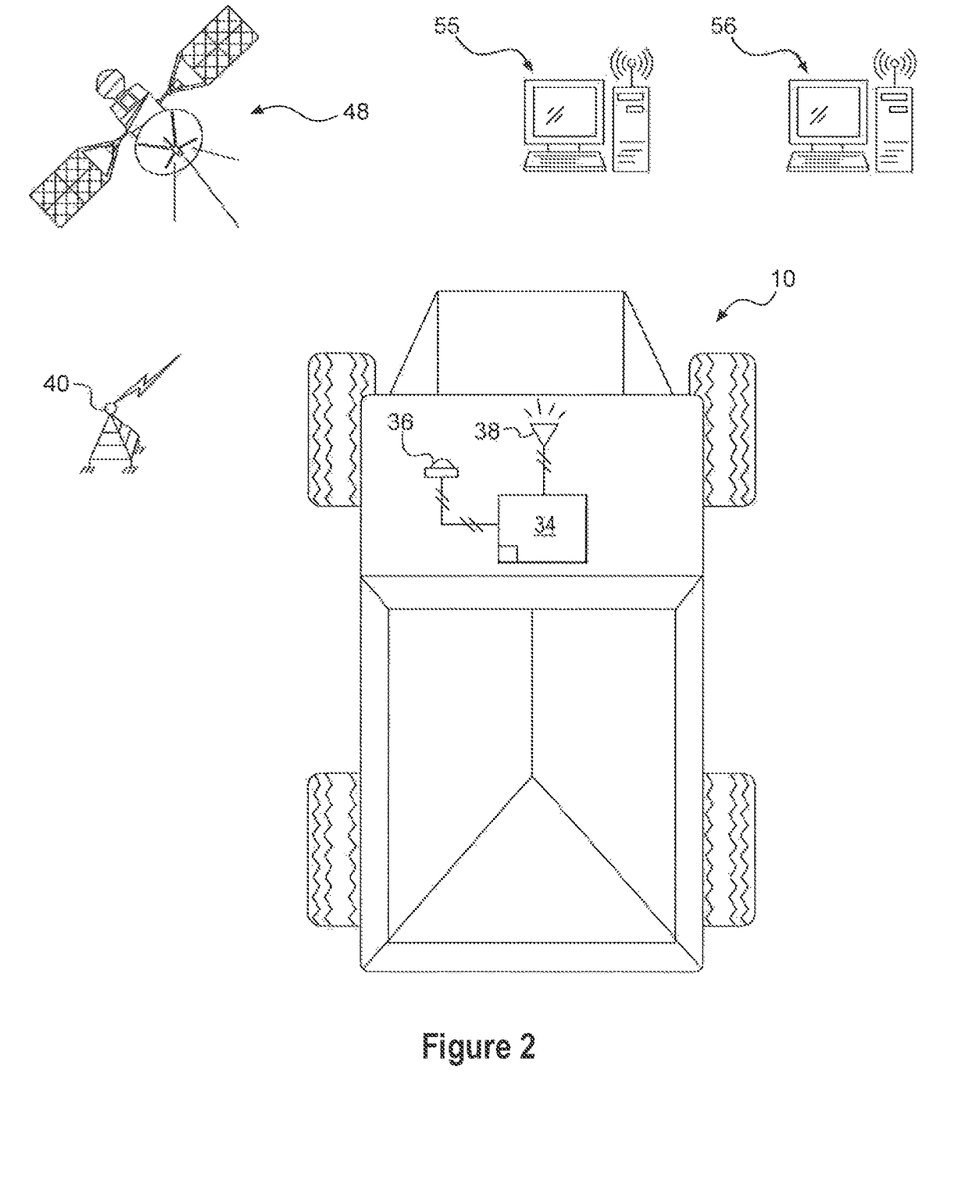
FIG. 2 is an illustration of an exemplary disclosed surveying system that may be used to communicate and process survey data from the work machine of FIG. 1.

As shown in FIGS. 1 and 2, as the work machine 10 travels about a worksite or otherwise across a distributed area, the work machine 10 can communicate with one or more offboard controllers 55, 56 using a communicating device 38 and transmit location signals using a locating device 36. The locating device 36 may include a Global Navigation Satellite System (GNSS) 48, a land-based cellular network, a local laser tracking system, or another type of positioning device or system may monitor the movements of the work machine 10 and generate signals indicative of its position. The position signals may be directed to a controller 34 for processing in conjunction with sensor data, or the position signals may be sent only to one or more of the offboard controllers 55, 56.

The communicating device 38 may include hardware and/or software that enables sending and receiving of data messages over a wireless network 40. The communicating device 38 may also facilitate communication between the controller 34 and/or between the controller 34 and one or more of the offboard controllers 55, 56. This communication may include, for example, the coordinates, speeds, and/or route of the work machine 10 generated based on signals from locating device 36. The communication may also include data messages including sensor data taken and processed by the controller 34 for further processing by the one or more offboard controllers 55, 56. Data messages may be sent and received via the wireless network 40. The wireless communications may include satellite, cellular, infrared, and any other type of wireless communications that enable communicating device 38 to exchange information between one or more of the offboard controllers 55, 56 and the controller 34 of the work machine 10.

Controller 34 may embody a single microprocessor or multiple microprocessors that include a means for processing data received from sensors on the work machine 10. Numerous commercially available microprocessors can be configured to perform the functions of controller 34. Controller 34 may include a memory, a secondary storage device, a processor, and any other components for running an application. Various other circuits may be associated with controller 34 such as power supply circuitry, signal conditioning circuitry, solenoid driver circuitry, and other types of circuitry.

Figure 3:
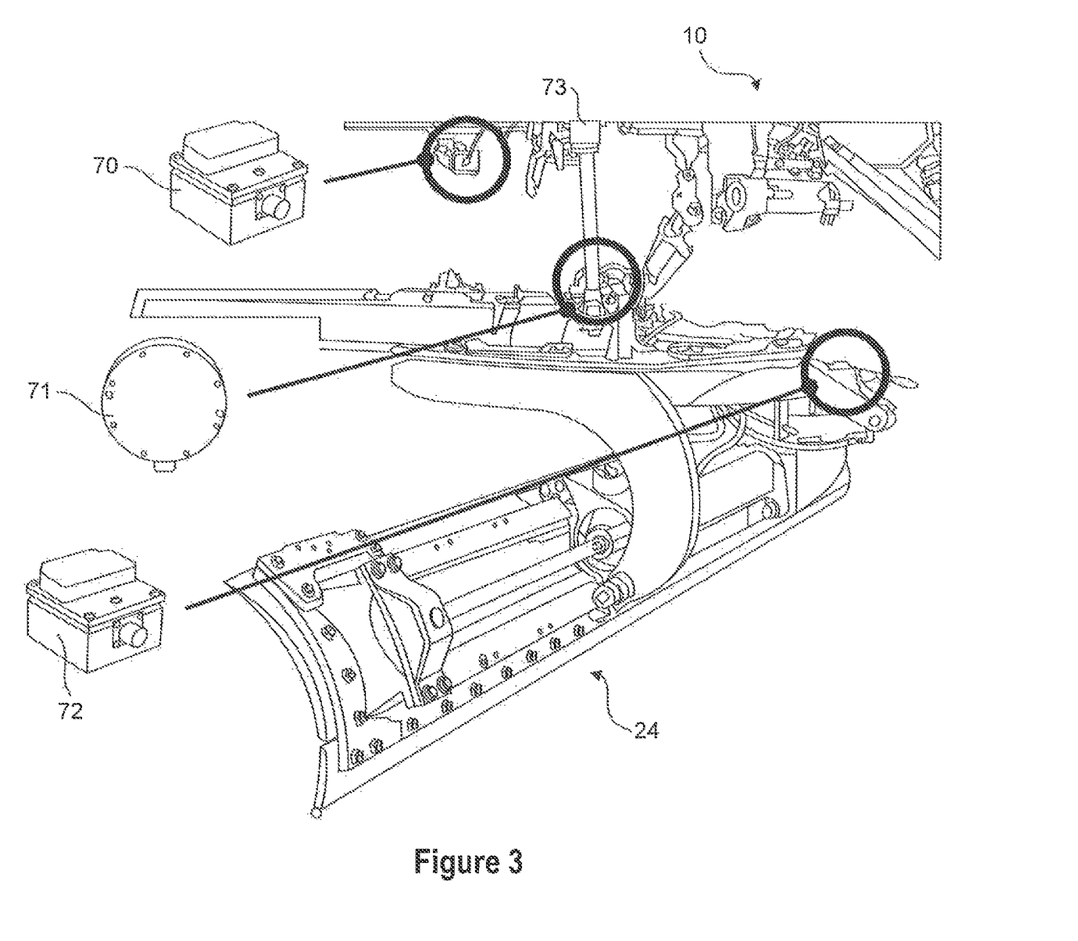
FIG. 3 is a view of exemplary sensors deployed on the work machine of FIG. 1.

The work machine 10 includes at least one sensor configured to produce a signal indicative of a longitudinal pitch of the work machine 10 and the lateral roll of the work machine 10 while the work machine 10 is mobile. The signals generated by the at least one sensor are communicated to the controller 34 for processing or for transmission to the one or more offboard controllers 55, 56. FIG. 3 illustrates the disclosed embodiment, in which one more sensors are provided on the motor grader. The sensors may include a single multi-axis inertial measurement unit 70 configured to produce a signal indicative of the longitudinal pitch of the work machine 10 and a signal indicative of the lateral roll of the work machine 10. Inertial measurement units are self-contained sensor systems capable of generating signals indicative of linear and angular motion. A multi-axis inertial measurement unit 70 includes two or more gyroscopes and accelerometers for measuring linear and angular motion in at least two dimensions (e.g., along two axes). In the disclosed embodiment, the axes of the multi-axis inertial measurement unit 70 are aligned with the longitudinal axis and the lateral axis of the work machine 10 to generate signals indicative of the longitudinal pitch and lateral roll of the work machine 10.

Alternatively, the sensors may include a single-axis inertial measurement unit 70 configured to produce the signal indicative of the longitudinal pitch of the work machine 10, and a blade slope sensor 72 configured to produce a signal indicative lateral slope of the moldboard blade 24. The axis of the single-axis inertial measurement unit 70 is aligned with the longitudinal axis of the work machine 10 to generate signals indicative of the longitudinal pitch of the work machine 10, while the blade slope sensor 72 generates signals indicative of the lateral roll of the work machine 10 when the moldboard blade 24 is aligned with a lateral axis of the work machine 10.

In yet another embodiment, the sensors may include the single-axis inertial measurement unit 70, the blade slope sensor 72, and a rotation sensor 71 configured to produce a signal indicative of the angle of the moldboard blade 24 relative to the front frame 12 and lateral axis of the work machine 10. The rotation sensor 71 produces a signal indicative of the direction of the moldboard blade 24 relative to the travel of the work machine 10. The rotation sensor 71 can be used in conjunction with the blade slope sensor 72 to determine the lateral roll of the work machine 10 when the moldboard blade 24 is aligned with the lateral axis of the work machine 10, ensuring the signals from the blade slope sensor 72 are measuring the slope of a roadway that is perpendicular to the direction of travel.

Finally, the sensors may additionally include a pressure sensor 73. The pressure sensor 73 is configured to produce a signal indicative of the moldboard blade 24 when contacting a ground surface, thereby signaling that the moldboard blade 24 is flush with the ground and measuring its profile.

Data is communicated from the work machine 10 and to one or more offboard controllers 55, 56 for further processing using the communicating device 38. The offboard controllers 55, 56 may include any suitable means for monitoring, recording, storing, indexing, processing, and/or communicating various operational aspects the work machine 10. These means may include components such as, for example, a memory, one or more data storage devices, a central processing unit, or any other components that may be used to run an application. Furthermore, although aspects of the present disclosure may be described generally as being stored in memory, one skilled in the art will appreciate that these aspects can be stored on or read from different types of computer program products or computer-readable media such as computer chips and secondary storage devices, including hard disks, floppy disks, optical media, CD-ROM, or other forms of RAM or ROM.

The offboard controllers 55, 56 may be configured to execute instructions stored on computer readable medium to process sensor and location data from the work machine 10, create alert based on that data, and dispatch additional work machines to address problems with the roadway derived from the data. The offboard controllers 55, 56 may include a single offboard controller for communicating with the work machine 10 and for processing the data, or the offboard controllers 55, 56 may include a first offboard controller 55 for communicating with the work machine 10 and second offboard controller 56 for processing the data. In the latter case, data may be transmitting from the first offboard controller 55 to the second offboard controller 56 for processing, while the second offboard controller 56 is not in direct communication with the work machine. This allows the second offboard controller 56 to be dedicated to processing and handling the data, while the first offboard controller 55 communicates with the work machine 10. In either embodiment, each of the offboard controllers 55, 56 may include a singular computer system or a plurality of networked computer systems.

The offboard controllers 55, 56 may communicate with the work machine 10 and process data from the work machine 10 either entirely independently from human control, or in some hybrid form. In the disclosed embodiment, the data is processed by one or more of the offboard controllers 55, 56 and a display is provided for generating visual output for human interrogation. The data includes survey data, in which sensor data indicating roadway measurements (e.g., cross slope and longitudinal slope) are linked to location data. A map of the survey data is provided on the display (see FIG. 6) for providing a visual depiction of the survey data and for further human analysis.

As illustrated in FIGS. 1 and 2, the work machine 10 may include a motor grader or any other type of work machine with sensors configured to generate signals indicative of the pitch and roll of the work machine as it moves along a roadway surface. The work machine 10 may also be any machine with work tools and sensors configured to generate signals based on the position of the work tools, where the work tools can be oriented so as to indicate the pitch and roll of the work machine 10.

INDUSTRIAL APPLICABILITY

The disclosed surveying system may be applicable to any work machine that includes sensors capable of generating signals indicative of the longitudinal pitch and lateral roll of the work machine. The disclosed surveying system allows a roadway to be surveyed by a mobile work machine as it moves along the roadway surface. This reduces the need for roadside surveying crews. The surveying system employs sensors on a work machine to determine the longitudinal slope 82 and cross-slope 80 of a roadway 90 (see FIGS. 4 and 5), and communicate that data to one or more offboard controllers for processing. The system may improve real-time monitoring of roadway conditions on a worksite or across a distributed area (e.g., across a county, etc.). In the disclosed embodment, the roadway includes a gravel, dirt, or otherwise unpaved surface, including one that may be at a worksite. The operation of surveying system will now be explained.

Figure 4:
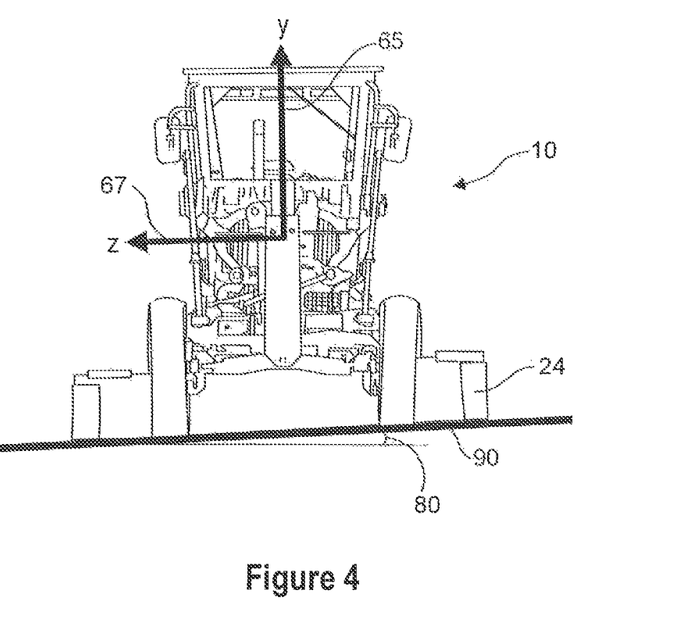
FIG. 4 is a front view of the exemplary disclosed work machine of FIG. 1 and a lateral cross-section of a roadway.
Figure 5:
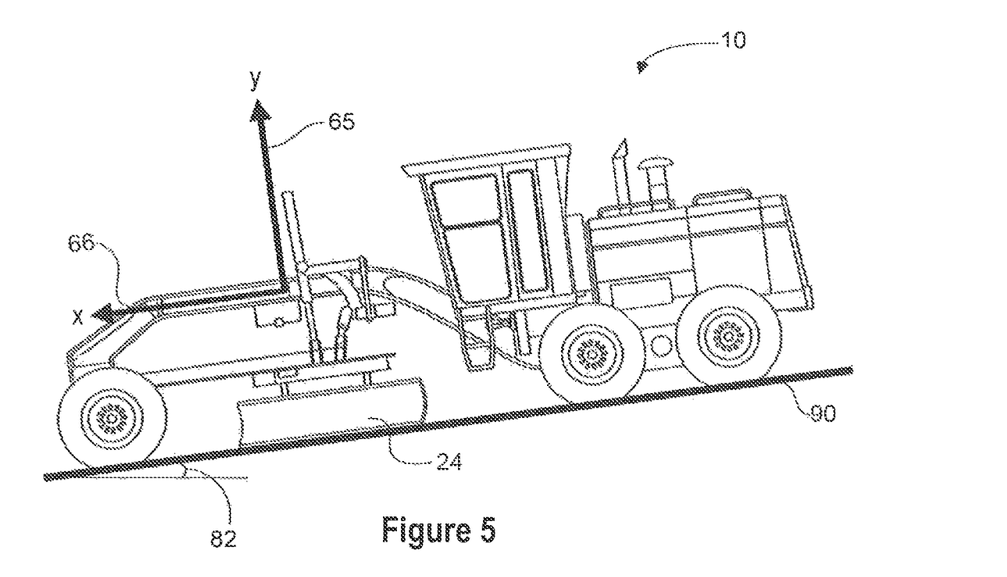
FIG. 5 is a side view of the exemplary disclosed work machine of FIG. 1 and a longitudinal cross-section of a roadway.

As shown in FIGS. 4 and 5, the surveying system of the present disclosure is configured to utilize sensors on a work machine 10 to determine the longitudinal slope 82 and cross-slope 80 of a roadway 90. The one or more sensors generate signals indicative of the pitch and roll of the work machine 10, which indicate the longitudinal slope 82 and cross-slope 80 of the roadway 90. The sensors gather data and include a sampling rate that allows longitudinal slope 82 and cross-slope 80 of the roadway 90 to be determined at numerous points along a section of travel. This allows operators to determine where the roadway is within specifications, and where variances occur outside of allowable ranges. In particular, the longitudinal slope 82 and cross-slope 80 of the roadway 90 can be compared to one or more threshold values in order to calculate variances. Those variances can then be used to determine where repairs may be necessary along the roadway 90.

The one or more sensors of the work machine 10 generate the signals indicative of the pitch and roll of the work machine 10, which are communicated to the controller 34. The controller uses the communicating device 38 to transmit those signals to one or more offboard controllers 55, 56. The controller 34 also receives location data from the locating device 36, and uses the location data to link the position of each sensor data point. Therefore, the pitch and roll of the work machine is measured and tagged to a position to create survey data. In the disclosed embodiment, the survey data is created by the controller 34 before it is transmitted to one or more of the offboard controllers 55, 56. However, the signals indicative of the pitch and roll of the work machine 10 and the position data may be sent separately in some embodiments for processing by one or more of the offboard controllers 55, 56.

The signals indicative of pitch and roll of the work machine 10 indicate the longitudinal slope 82 and cross-slope 80 of the roadway 90 as the work machine 10 travels down the roadway. Roll of the work machine 10, as illustrated in FIG. 4, is measured as an angle between a lateral axis 67 of the work machine 10 and the horizon. Roll of the work machine 10 can also be measured as an angle between a vertical axis 65 of the work machine 10 and a vertical line in a plane defined between the lateral axis 67 and vertical axis 65 of the work machine 10. When the work machine 10 is level and the sensors are aligned with a longitudinal axis 66 and a lateral axes 67 of the work machine 10, where roll of the work machine 10 indicates the cross-slope 80 of the roadway 90.

Pitch of the work machine 10, as illustrated in FIG. 5, is measured as an angle between the longitudinal axis 66 of the work machine 10 and the horizon. Pitch of the work machine 10 can also be measured as an angle between the vertical axis 65 of the work machine 10 and a vertical line in a plane defined between the longitudinal axis 66 and vertical axis 65 of the work machine 10. As with the cross-slope, when the work machine 10 is level and the sensors are aligned with the longitudinal and lateral axes 66, 64 of the work machine 10, the pitch of the work machine 10 indicates the longitudinal slope 82 of the roadway 90.

Figure 6:
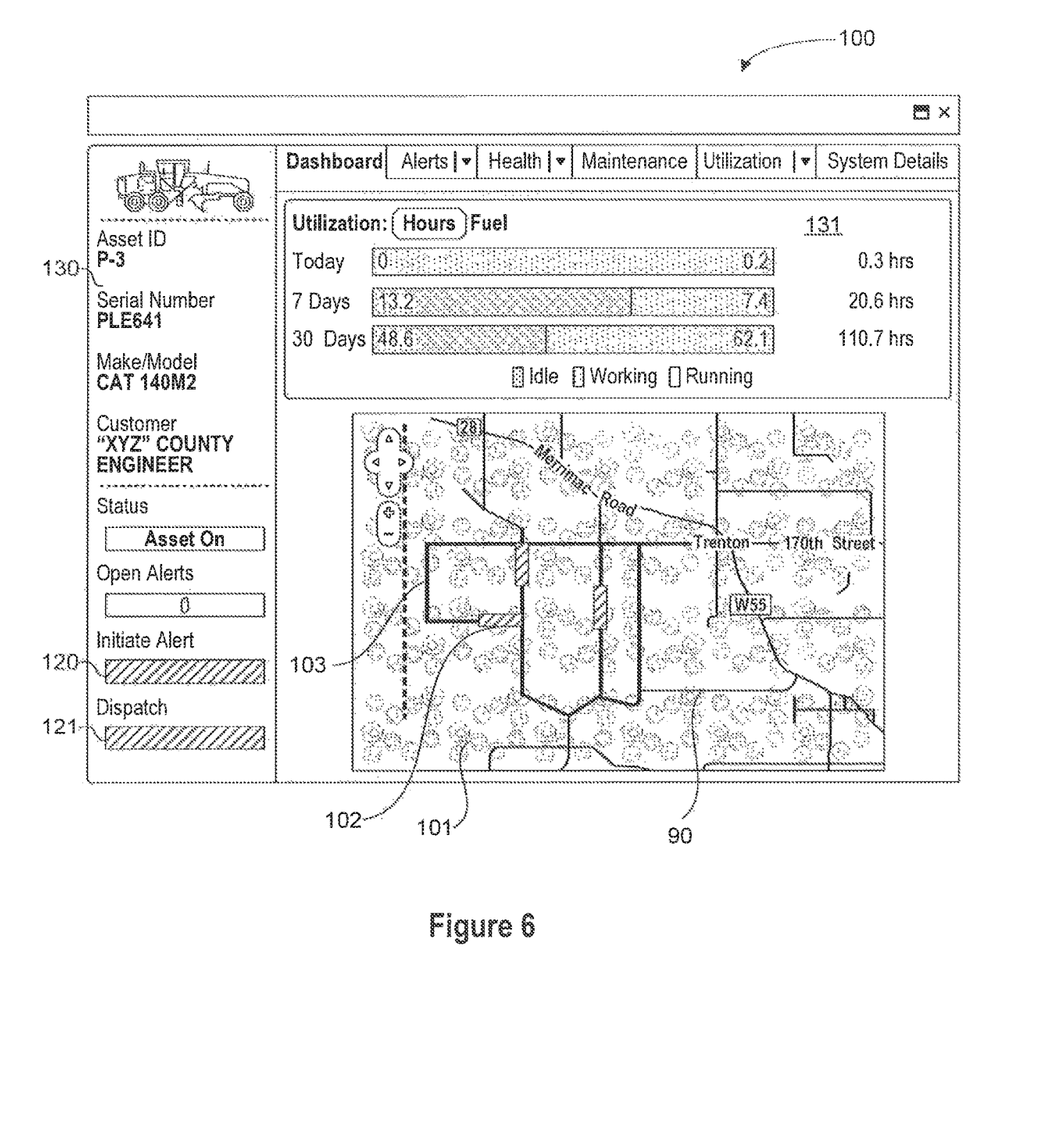
FIG. 6 a view of an exemplary map displaying roadway variances based on survey data taken by the disclosed work machine of FIG. 1.

In processing the longitudinal slope 82 and cross-slope 80 of the roadway 90, this data is linked to location data so that longitudinal slope 82 and cross-slope 80 can be analyzed and presented with reference to location along the roadway 90. The controller 34 receives the signals from the at least one sensor on the work machine 10, creates survey data by linking the signals with the location of the work machine 10, and communicates the survey data using the communicating device 38 over the network 40 to one or more offboard controllers 55, 56. At least one of the offboard controllers 55, 56 processes the survey data by first receiving it, either directly from the communicating device 38 or from another intermediate source. After receipt, data at each location along the roadway 90 is compared to one or more threshold values or ranges (e.g., threshold longitudinal slope and threshold cross-slope) to calculate a variance. The variance is the difference between the indicated longitudinal slope or cross-slope from a maximum allowable value, a mean value, or desired value. As shown in FIG. 6, a map 101 of the variances 103 is generated for each location along the roadway 90, in which the variances 103 are overlaid onto the roadway 90. The generated map 101 may be presented as a heat map, providing a visual indication of the magnitude of the variances 103 at all locations for which survey data is available. The color, line weight 102, or alternative variable related to the overlaid variances 103 may vary with the magnitude of the variance 103.

The threshold values represent predetermined longitudinal slope and cross-slope values for different points along the roadway 90. The predetermined values may be desired or intended longitudinal slope and cross-slope of the roadway for particular points along a roadway, within a worksite, or in a particular region (e.g., for all roadways within a particular county, etc.). The threshold values may be set by an administrator of the surveying system and may reflect government, administrative, industry, or organization standards. The predetermined values may also be derived from other sources or be determined based on a given section of roadway taking into account safety, the roadway environment, and the vehicles that will use the roadway. The threshold values may be set and may be changed using the one or more offboard controllers 55, 56, and set during and/or after the work machine 10 traverses a particular roadway, collects data, and transmits the data to the one or more offboard controllers 55, 56. The threshold values may also be changed after the longitudinal slope and cross-slope data has been gathered to change the map 101 and engage in further analysis. The threshold values are used as a measure of the maximum and/or minimum allowable longitudinal slope and cross-slope, and thus are used to control the shape of the roadway.

In the disclosed embodiment, the map 101 is generated on a display and within a user interface 100. The user interface 100 is a dashboard in which a human operator can view the map 101 of the survey data and take additional action. The map 101 is preferably dynamically updated as survey data is received, both for new locations for which no survey data exists, and for locations with preexisting survey data. From the user interface 100, the operator may initiate an alert if the variances 103 exceed an alert threshold. Alternatively the offboard controller processing the data may automatically initiate the alert. In addition, the user interface 100 may allow the operator to communicate instructions dispatching one or more work machines to one or more locations in which the variances 103 exceed a repair threshold. For human operator initiated requests, an initiate alert button 120 and dispatch button 121 may be provided. However, these functions may also be automatically initiated by the offboard controller without human intervention or human request, and based solely or in part on the survey data being received.

The user interface 100 may provide additional information to a human operator via the display. In particular, the path of a particular work machine and the work machine details 130 can be viewed. The usage of the work machine 131 can be viewed. The user interface 100 may also allow the human operator to track more than one work machine 10, initiate alerts, and dispatch one or more assets on demand.

In instances in which a motor grader with a moldboard blade 24 is employed as the work machine 10, it may be necessary for further processing to be conducted in order to calculate the longitudinal slope 82 and cross-slope 80 of the roadway 90. In particular, if the sensors measuring the moldboard blade 24 are employed, and the moldboard blade 24 is not aligned with the lateral axis of the motor grader, additional calculations will be necessary to derive the longitudinal slope 82 and cross-slope 80 of the roadway 90. In particular, the at least one offboard controller may be further configured to correlate the signal indicative of a longitudinal pitch of the work machine 10 to a longitudinal slope 82 of the roadway and correlate the signal indicative of a lateral roll of the work machine 10 to cross slope 80 of the roadway by accounting for the moldboard blade 24 position. After this, the variances 103 can be calculated Several advantages over the prior art may be associated with the survey system of the present disclosure. These include leveraging existing sensors on work machines to survey a worksite or a distributed roadway network, and using a mobile machine rather than human survey crews to create survey data. The use of sensors on a work machine allow data to be gathered over a broad area swiftly and economically, where real-time updates can be made and viewed from a remote location. This allows road conditions to be monitored and addressed, improving production and safety. Worksite, construction, and municipal operators would benefit from the disclosed survey system.

It will be apparent to those skilled in the art that various modifications and variations can be made to the surveying system. Other embodiments will be apparent to those skilled in the art from consideration of the specification and practice of the disclosed surveying system. It is intended that the specification and examples be considered as exemplary only, with a true scope being indicated by the following claims and their equivalents.

What is claimed is:

1. A surveying system, comprising:
   a work machine having at least one sensor configured to produce a signal indicative of a longitudinal pitch of the work machine and a signal indicative of a lateral roll of the work machine;
   a locating device disposed on the work machine configured to determine a location of the work machine;
   a communicating device disposed on the work machine configured to communicate over a network;
   a controller disposed on the work machine and in communication with the at least one sensor and the locating device, the controller configured to:
      receive the signals from the at least one sensor;
      create survey data by linking the signals with the location of the work machine; and
      communicate the survey data using the communicating device over the network to one or more offboard controllers, at least one offboard controller of said one or more offboard controllers being configured to:
         compare the survey data to one or more threshold values and calculate variances; and
         generate a map displaying the variances; and
   a motor grader with a motor grader blade,
   wherein the at least one sensor includes a blade slope sensor configured to produce the signal indicative of the lateral roll of the work machine when the motor grader blade is aligned with a lateral axis of the work machine.

2. The surveying system of claim 1, wherein:
   the at least one sensor further includes:
   a multi-axis inertial measurement unit configured to produce the signal indicative of the longitudinal pitch of the work machine.

3. The surveying system of claim 1, wherein:
   the at least one sensor further includes:
      an inertial measurement unit configured to produce the signal indicative of the longitudinal pitch of the work machine.

4. The surveying system of claim 1, wherein:
   the at least one sensor further includes:
      an inertial measurement unit configured to produce the signal indicative of the longitudinal pitch of the work machine; and a rotation sensor configured to produce a signal indicative of an angle of the motor grader blade relative to the lateral axis of the work machine.

5. The surveying system of claim 1, wherein:
the at least one sensor further includes:
an inertial measurement unit configured to produce the signal indicative of the longitudinal pitch of the work machine;
a rotation sensor configured to produce a signal indicative of an angle of the motor grader blade relative to the lateral axis of the work machine; and
a pressure sensor configured to produce a signal indicative of the motor grader blade contacting a ground surface.

6. The surveying system of claim 1, wherein the at least one offboard controller is further configured to:
dynamically update the map with the survey data received for new locations and locations with preexisting survey data.

7. The surveying system of claim 1, wherein the at least one offboard controller is further configured to:
initiate an alert if the variances exceed an alert threshold.

8. The surveying system of claim 1, wherein the at least one offboard controller is further configured to:
communicate instructions dispatching one or more work machines to one or more locations in which the variances exceed a repair threshold.

9. The surveying system of claim 1, wherein the at least one offboard controller is further configured to:
correlate the signal indicative of a longitudinal pitch of the work machine to a longitudinal slope of a roadway;
correlate the signal indicative of a lateral roll of the work machine to cross slope of the roadway; and
calculate the variances by comparing the longitudinal slope of a roadway to a threshold longitudinal slope value and by comparing the cross slope of the roadway to threshold cross slope value.

10. A method of surveying, comprising:
receiving signals from at least one sensor on a work machine, the signals including a signal indicative of a longitudinal pitch of the work machine and a signal indicative of a lateral roll of the work machine;
receiving a location of the work machine;
creating survey data by linking the received signals with the location of the work machine;
communicating the survey data over a network;
correlating the signal indicative of the longitudinal pitch of the work machine to a longitudinal slope of a roadway;
correlating the signal indicative of the lateral roll of the work machine to cross slope of the roadway; and
calculating variances by comparing the longitudinal slope of the roadway to a threshold longitudinal slope value and by comparing the cross slope of the roadway to a threshold cross slope value.

11. The method of surveying of claim 10, further including:
using a multi-axis inertial measurement unit configured to produce the signal indicative of the longitudinal pitch of the work machine and the signal indicative of the lateral roll of the work machine.

12. The method of surveying of claim 10, further including:
using an inertial measurement unit configured to produce the signal indicative of the longitudinal pitch of the work machine;
aligning a motor grader blade with a lateral axis of the work machine; and
using a blade slope sensor configured to produce the signal indicative of the lateral roll of the work machine when the motor grader blade is aligned with the lateral axis of the work machine.

13. The method of surveying of claim 10, further including:
using an inertial measurement unit configured to produce the signal indicative of the longitudinal pitch of the work machine;
aligning a motor grader blade with a lateral axis of the work machine;
using a blade slope sensor configured to produce the signal indicative of the lateral roll of the work machine when the motor grader blade is aligned with the lateral axis of the work machine; and
using a rotation sensor configured to produce a signal indicative of an angle of the motor grader blade relative to the lateral axis of the motor grader blade.

14. The method of surveying of claim 10, further including:
using an inertial measurement unit configured to produce the signal indicative of the longitudinal pitch of the work machine;
aligning a motor grader blade with a lateral axis of the work machine; and
using a blade slope sensor configured to produce the signal indicative of the lateral roll of the work machine when the motor grader blade is aligned with the lateral axis of the work machine;
using a rotation sensor configured to produce a signal indicative of an angle of the motor grader blade relative to the lateral axis of the motor grader blade; and
using a pressure sensor configured to produce a signal indicative of the motor grader blade contacting a ground surface.

15. The method of surveying of claim 10, wherein said communicating the survey data over the network further includes:
communicating the survey data to an offboard controller over the network.

16. A method of surveying, comprising:
receiving sensor data from at least one sensor on a work machine, the at least one sensor configured to produce a signal indicative of a longitudinal pitch of the work machine and a signal indicative of a lateral roll of the work machine;
receiving a location of the work machine linked to each of the sensor data;
comparing the sensor data to one or more threshold values and calculating variances;
generating a map of the variances based on the location of the work machine for each sensor data;
initiating an alert if one or more of the variances exceeds an alert threshold; and
communicating instructions dispatching one or more work machines to one or more locations in which the variances exceed a repair threshold.

17. The method of surveying of claim 16, further including:
updating the map with the variances for sensor data received for new locations and locations with preexisting sensor data.

18. The method of surveying of claim 16, further including:

correlating the signal indicative of the longitudinal pitch of the work machine to a longitudinal slope of a roadway;

correlating the signal indicative of the lateral roll of the work machine to cross slope of the roadway; and calculating the variances by comparing the longitudinal slope of the roadway to a threshold longitudinal slope value and by comparing the cross slope of the roadway to a threshold cross slope value.

* * * * *